(12) United States Patent
Chung et al.

(10) Patent No.: US 8,398,289 B2
(45) Date of Patent: Mar. 19, 2013

(54) STRUCTURE FOR ELIMINATING BRIGHT LINE OF TILED BACKLIGHT MODULE

(75) Inventors: Sheng-Ju Chung, Taoyuan (TW); Tung-Chuan Su, Taoyuan (TW); Yu-Jeng Lin, Taipei (TW); Wen-Yen Huang, Taipei (TW); Yi-Chieh Lu, Taoyuan (TW)

(73) Assignee: Global Lighting Technologies (Taiwan) Inc., Chung-Li (TW)

( * ) Notice: Subject to any disclaimer, the term of this patent is extended or adjusted under 35 U.S.C. 154(b) by 740 days.

(21) Appl. No.: 12/581,853

(22) Filed: Oct. 19, 2009

(65) Prior Publication Data
US 2010/0142219 A1  Jun. 10, 2010

(30) Foreign Application Priority Data
Dec. 9, 2008  (TW) ................ 97222060 U (51) Int. Cl.
*F21V 7/22*  (2006.01)
*F21V 7/04*  (2006.01)

(52) U.S. Cl. .................. 362/613; 362/606; 359/893

(58) Field of Classification Search .................. 362/613, 362/606; 359/893
See application file for complete search history.

(56) References Cited

U.S. PATENT DOCUMENTS

| | | | |
|---|---|---|---|
| 6,612,722 B2* | 9/2003 | Ryu et al. | 362/331 |
| 2008/0144333 A1* | 6/2008 | Gourlay | 362/609 |
| 2009/0207342 A1* | 8/2009 | Yamaguchi et al. | 349/65 |

* cited by examiner

*Primary Examiner* — Tracie Y Green
(74) *Attorney, Agent, or Firm* — Lin & Associates IP, Inc.

(57) ABSTRACT

A structure for eliminating bright lines of a tiled backlight module is provided. The structure includes a light guide plate, and a plurality of light sources. The light guide plate includes a plurality of rows of optical elements. The rows of optical elements extend in parallel. The light sources are provided at least one side of the light guide plate for projecting a light into the light guide plate and generating a regular but non-uniform light outputting performance of the light guide plate. Therefore, a brightness of areas where the optical elements are located is higher than the rest areas, so that the light guide plate achieves a regular but non-uniform light emitting performance. Accordingly, the bright lines occurred at joints between two light guide plates are enshrouded by the high brightness areas, and become hard to identify or even undistinguishable, thus "eliminated".

13 Claims, 11 Drawing Sheets

STRUCTURE FOR ELIMINATING BRIGHT LINE OF TILED BACKLIGHT MODULE

BACKGROUND OF THE INVENTION

1. Field of the Invention

The present invention relates generally to a structure for eliminating bright lines occurred at joints between small-size light guide plates (LGP) which constitute a large-size tiled LGP, wherein the bright lines are usually caused by refraction of light at the joints due to the medium variation.

2. The Prior Arts

Liquid crystal display (LCD) panels are widely used in many electronic products, such as notebook computers, computer displays, mobile phones, or LCD televisions. Typically, the operation of an LCD panel must be facilitated with a backlight module for providing a backlight to illuminate the LCD panel for displaying images. As such, the backlight module is a necessary part of the LCD panel. Further, backlight modules may even employed in other electronic products which require for backlight illumination.

A typical backlight module employed in an LCD panel usually includes a LGP and a backlight source. Most conventional LCD televisions adopt lamps serving as backlight sources installed at back sides of the LGPs. However, this disadvantageously increases the overall thickness of the LCD televisions. In order to produce LCD televisions having a smaller thickness, it has been proposed to employ light emitting diodes (LED) serving as a backlight source of the backlight module. In such a backlight module, a plurality of LEDs are provided at a side edge of the LGP, a reflective sheet is provided at a first surface of the LGP, and a plurality of optical sheets including a diffusion sheet and a prism sheet are provided at a second surface of the LGP opposite to the first surface. All of these elements are then framed in an outer frame. The backlight source emits a light. The light is then projected into the LGP from the side edge of the LGP. A part of the light is then reflected, and then sequentially passes through the diffusion sheet and the prism sheet for outputting.

The LGP is an optical apparatus, and is usually required for a high caliber of optical precision and performance. As such, a large-size LGP is usually harder for fabrication and requires a higher cost than a small-size LGP. Accordingly, it is further proposed to tile a plurality of small-size LGPs into a large-size LGP for a large-size LCD display.

Figure 8:
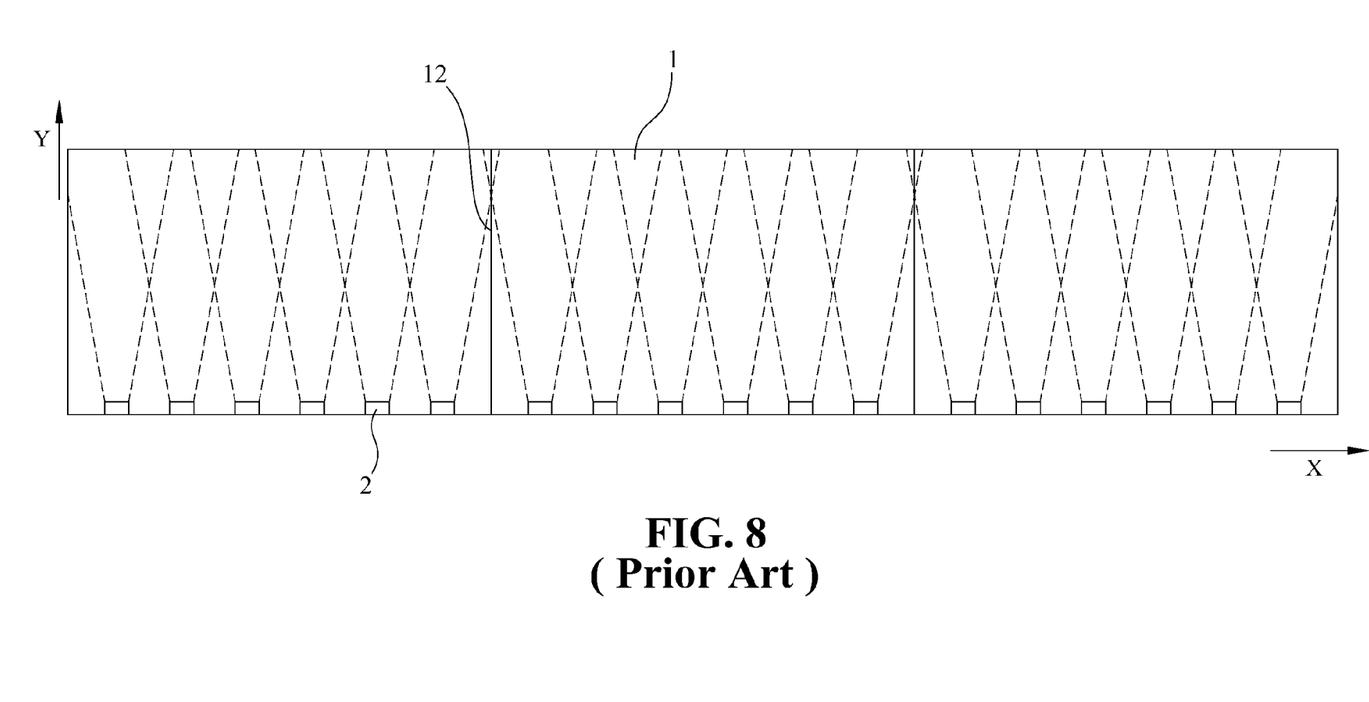
FIG. 8 illustrates a tiled LGP structure including a plurality of flat small-size LGPs according to a conventional technology.
Figure 8A:
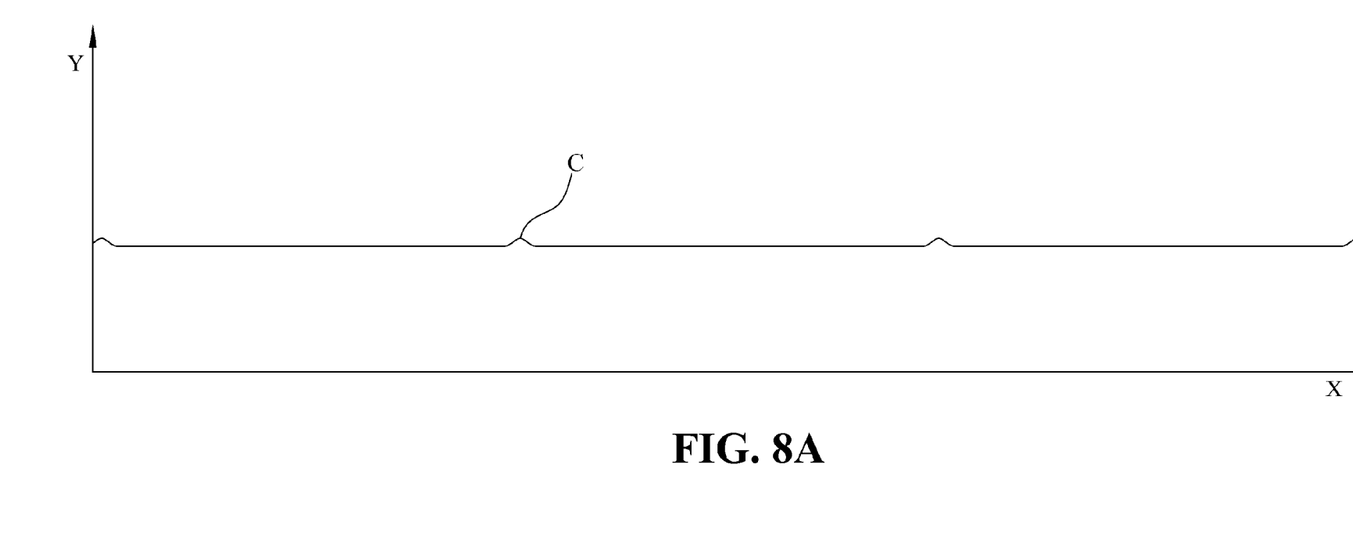
FIG. 8A is a brightness curve depicting the brightness distribution when the tiled large-size LGP as shown in FIG. 8 is projected with a light by light sources.

Referring to FIG. 8, there is shown a tiled LGP structure including a plurality of flat small-size LGPs 1. Each of the flat small-size LGPs 1 has at least one jointing side 12, and a lateral side. Prior to fabricating the tiled LGP structure, the jointing sides 12 of the flat small-size LGPs 1 are polished, so as to allow the jointing sides 12 of each two neighboring small-size LGPs 1 to be closely contacted and form a joint therebetween. Each of the small-size LGPs 1 is provided with one or more LED backlight sources 2 at the lateral side thereof. The LED backlight sources 2 are adapted for projecting a light into the tiled LGP structure. The light is then transmitted inside the tiled LGP structure, and then achieves a performance as a surface light source. However, the joint between the jointing sides 12 of the small-size LGPs 1 present a different medium feature relative to the small-size LGPs 1. As such, the light is likely to be refracted at the joint between the jointing sides 12 of the small-size LGPs 1, thus producing a bright line C having a brightness higher than an average brightness of the tiled LGP structure (as indicated in the brightness curve shown in FIG. 8A).

SUMMARY OF THE INVENTION

A primary objective of the present invention is to provide a solution for eliminating bright lines occurred at joints between small-size LGPs which constitute a large-size tiled LGP.

According to an embodiment of the present invention, a large-size LGP is constituted of a plurality of small-size LGPs arranged side by side. Each of the small-size LGPs is pre-configured with a plurality of optical strips, and each optical strip includes a plurality of optical elements. The optical strips are regularly or irregularly arranged in parallel. In such a way, when a light is projected inside the large-size LGP, areas where the optical strips are located are distributed with a high brightness, and the rest areas are distributed with a low brightness or even darkness. Accordingly, the bright lines occurred at joints between small-size LGPs are enshrouded by the high brightness areas, and become hard to identify or even undistinguishable. That means, the bright lines are "eliminated".

According to an aspect of the present invention, the LED light sources are positioned at least one end of respective optical strip, in that the light is projected in the areas where the optical strips are located along a direction longitudinally extending from optical strips.

According to another embodiment of the present invention, the LED light sources are positioned at an end portion of another side of the LGP, in that the light is projected in the areas where the optical strips are located along a direction perpendicular with a longitudinally extending direction of the optical strips.

According to an aspect of the embodiment, all of the LED light sources are adapted for producing a same brightness. According to another aspect of the embodiment, the brightness of different LED light sources is not identical to others.

In accordance with the tiled large-size LGP, a plurality of high brightness areas are presented by the light projected by the LED light sources. The LED light sources are provided at a side edge of the tiled large-size LGP. A reflective sheet is provided at a first surface of the tiled large-size LGP, and a plurality of optical sheets including a diffusion sheet and a prism sheet are provided at a second surface of the tiled large-size LGP opposite to the first surface. The diffusion sheet and the prism sheet are adapted for diffusing and scattering the light provided from the high brightness areas, so as to finally obtain a uniformed brightness displayed on the glass substrate.

According to an embodiment of the present invention, the present invention is featured in that it provides a plurality of rows of optical elements on each of a plurality of small-size LGPs which constitute a tiled large-size LGP. The rows of optical elements are equidistantly disposed and parallel extended on the small-size LGP. A plurality of LED light sources are provided at least one side of the tiled large-size LGP for projecting a light into the tiled large-size LGP. Therefore, a brightness of areas where the optical elements are located is higher than the rest areas, so that the whole tiled large-size LGP achieves a regular but non-uniform light emitting performance. The optical elements are preferred to be a plurality of fine dots protruded out or recessive from the surface of the small-size LGP. The light can be reflected and/or deflected by the fine dots for improving the brightness thereby.

According to an aspect of the embodiment, the fine dots are more sparsely distributed at positions more distant away from the LED light sources for reflecting and refracting less of the light, and are more densely distributed at positions more adjacent the LED light sources for reflecting and refracting more of the light, so as to achieve an improved uniformed brightness performance over the whole row of optical elements.

According to an aspect of the embodiment, the LED light sources are provided at one end or two ends of each row of optical elements, so as to project the light along a direction parallel with a longitudinal distributing direction of the row of optical elements. According to a further aspect of the embodiment, the LED light sources are provided at another side of the tiled large-size LGP, for projecting the light along a direction perpendicular to the longitudinal distributing direction of the row of optical elements.

According to another aspect of the embodiment, the LED light sources are provided at one end of each row of optical elements, and LED light sources provided at each two neighboring rows of optical elements are positioned at opposite sides of the tiled large-size LGP.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
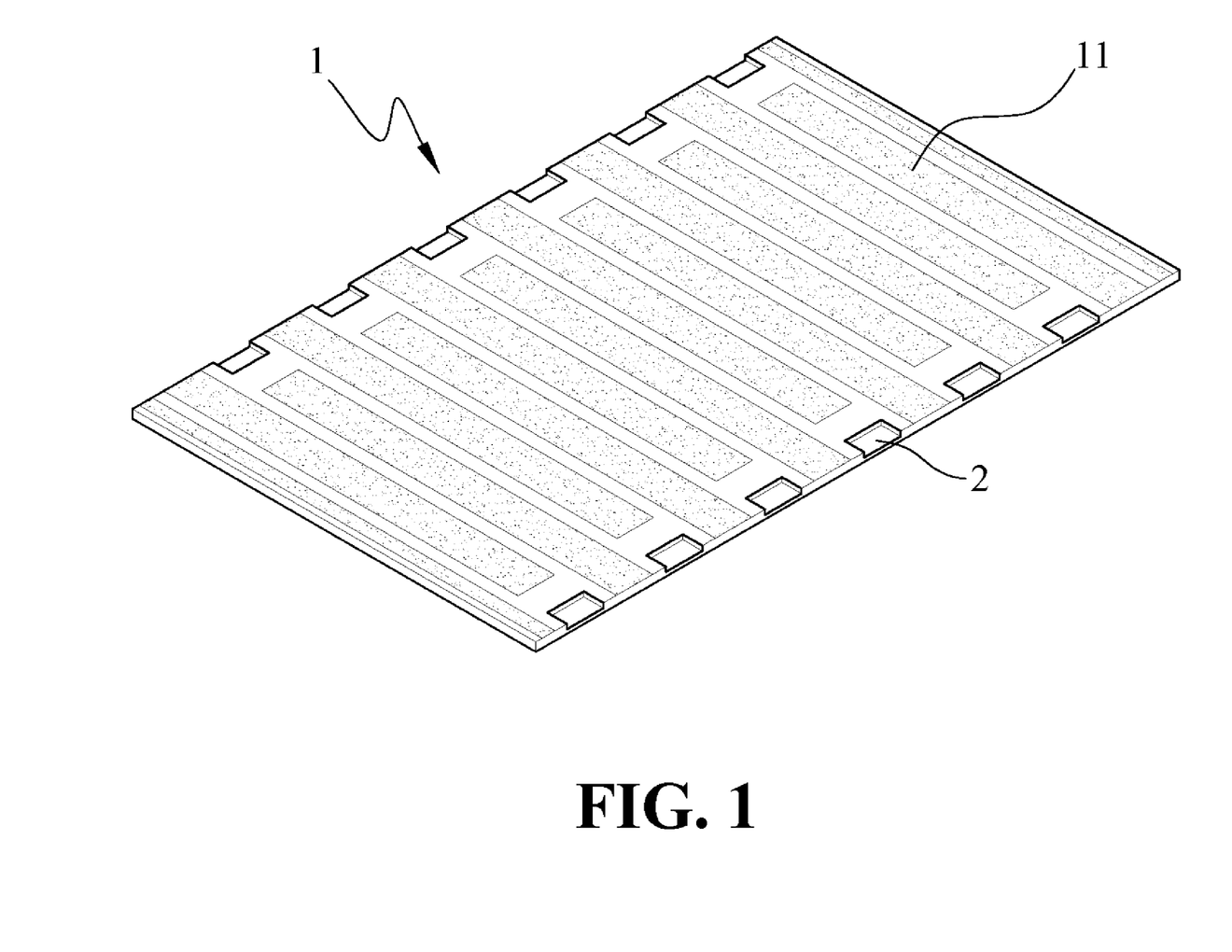
FIG. 1 is a perspective view of a small-size light guide plate (LGP) according to a first embodiment of the present invention.

FIG. 1 is a perspective view of a small-size light guide plate (LGP) according to a first embodiment of the present invention. Referring to FIG. 1, there is shown a small-size LGP 1. The small-size LGP 1 includes a plurality of extending optical strips 11 configured thereon. Each optical strip 11 includes a plurality of optical elements. The extending optical strips 11 are equidistantly or non-equidistantly distributed in parallel. A light source 2 is provided at one end of each of the extending optical strips 11. The light source 2 is adapted for projecting a light along a longitudinal extending direction of the extending optical strips 11, such that a brightness of strip shaped areas where the extending optical strips 11 are located is apparently higher than the rest areas of the small-size LGP 1. In such a way, the small-size LGP 1 achieves a regular but non-uniform light emitting performance. In the current embodiment, the light sources 2 are preferred to be light emitting diodes (LED). According to an aspect of the embodiment, all of the LED light sources 2 are adapted for producing a same brightness. According to another aspect of the embodiment, the brightness of different LED light sources 2 is not identical to others. Further, according to another aspect of the embodiment, the LED light sources 2 provided at each two neighboring extending optical strips 11 are positioned at opposite sides of the small-size LGP.

Preferably, the optical elements of the extending optical strips 11 are a plurality of fine dots protruded out or recessive from the surface of the small-size LGP 1. The light can be reflected and/or deflected by the fine dots for improving the brightness thereby. The fine dots are more sparsely distributed at positions which are more distant away from the LED light sources 2 for reflecting and refracting less of the light, and are more densely distributed at positions more adjacent the LED light sources 2 for reflecting and refracting more of the light, so as to achieve an improved uniformed brightness performance over the whole row of optical elements.

Figure 2:
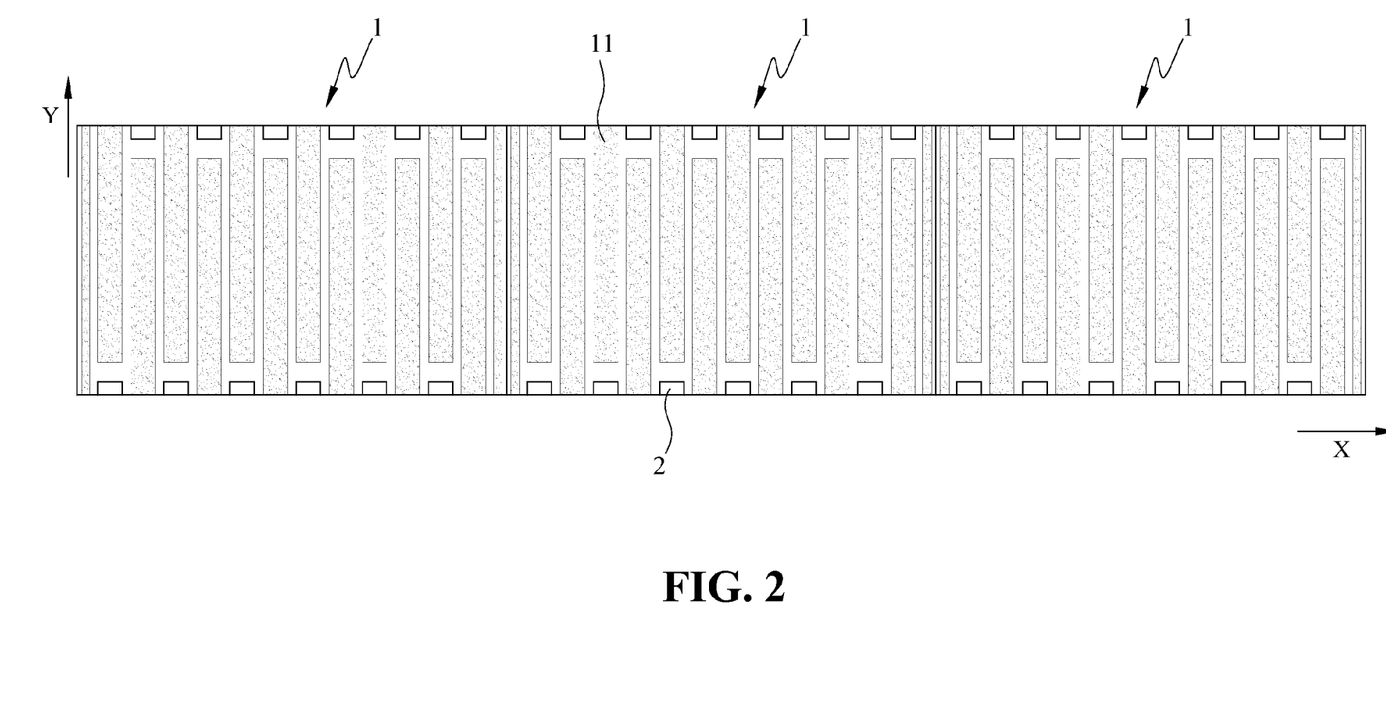
FIG. 2 is a top view of a tiled large-size LGP constituted by side-by-side tiling two small-size LGPs as illustrated in FIG. 1.
Figure 2A:
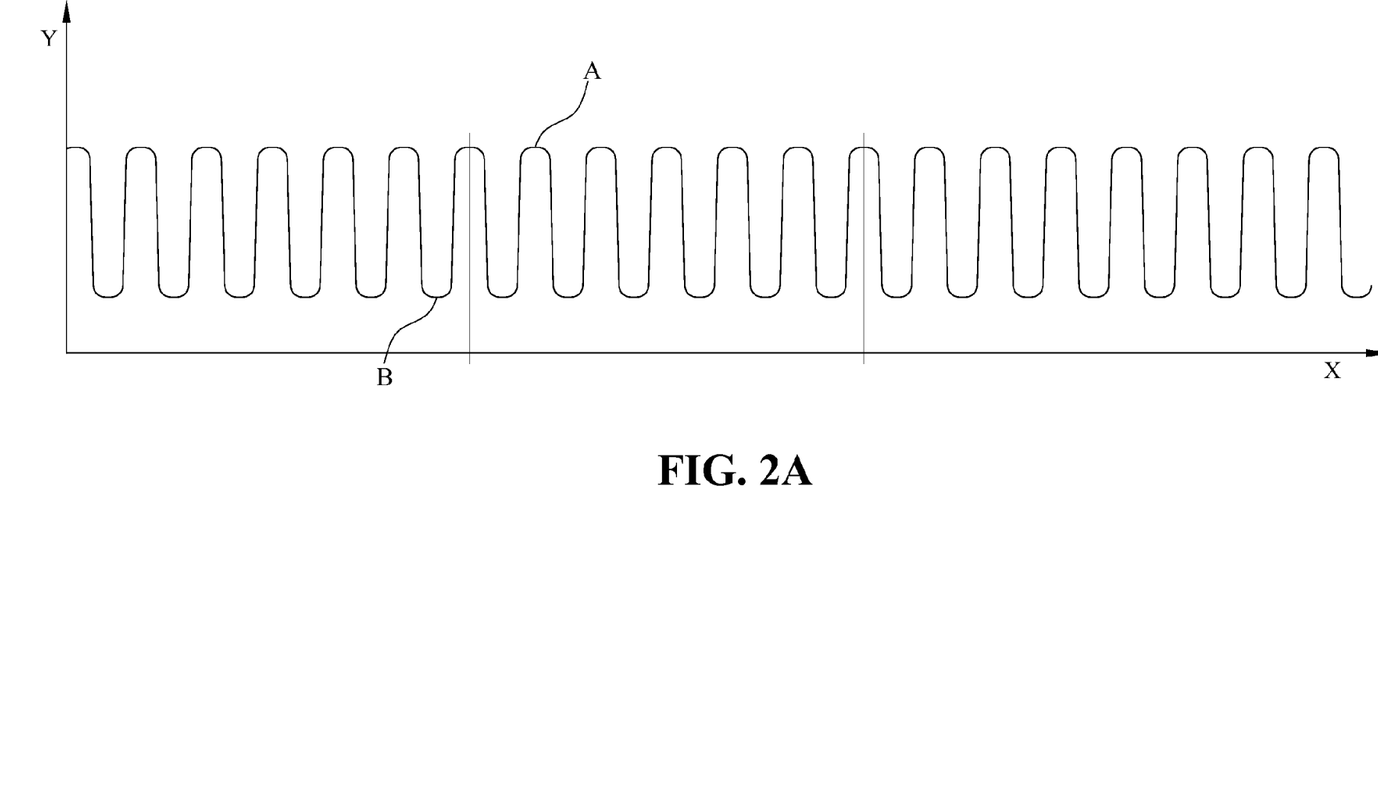
FIG. 2A is a brightness curve depicting the brightness distribution when the tiled large-size LGP as shown in FIG. 2 is projected with a light by light sources.
Figure 3:
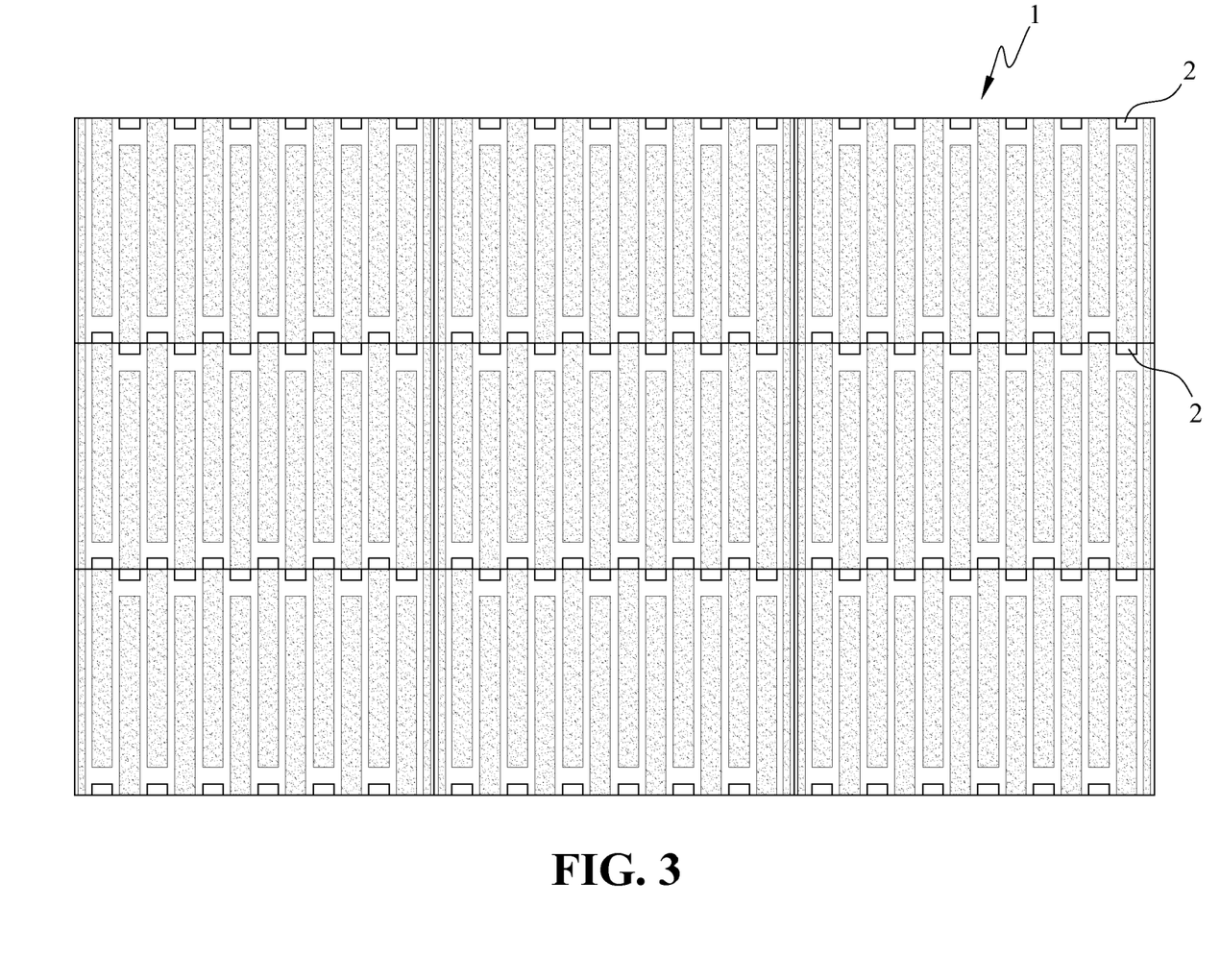
FIG. 3 is a top view of a tiled large-size LGP constituted by side-by-side tiling a plurality of small-size LGPs as illustrated in FIG. 1.

The small-size LGP 1 is preferred to be rectangular-shaped having four sides, each of which is polished severing as a jointing side 12. FIG. 2 is a top view of a tiled large-size LGP constituted by side-by-side tiling the small-size LGPs as illustrated in FIG. 1. As shown in FIG. 2, the large-size LGP is configured by tiling the small-size LGPs 1 side-by-side along X-direction as defined in FIG. 2, and the light sources 2 project the light along Y-direction, i.e., along which the extending optical strips 11 longitudinally extend. In such a way, the areas where the optical strips 11 are located have a higher brightness and are defined as high brightness areas, and the rest areas have a lower brightness or even darkness and are defined as low brightness areas. Referring to the brightness curve shown in FIG. 2A, A represents the brightness of the high brightness areas, and B represents the brightness of the low brightness areas. As such, when the light is projected inside the large-size LGP, the bright lines occurred at joints 12 between the small-size LGPs 1 are enshrouded by the high brightness areas, and become hard to identify or even undistinguishable. That means, the bright lines are "eliminated". Further, the LED light sources 2 can also be provided at both ends of the optical strips 11, so that the light can be projected from opposite sides. FIG. 3 is a top view of a tiled large-size LGP constituted by side-by-side tiling a plurality of small-size LGPs as illustrated in FIG. 1. As shown in FIG. 3, more small-size LGPs 1 can be used for tiling to obtain an even larger LGP.

In accordance with the tiled large-size LGP, a plurality of high brightness areas are presented by the light projected by the LED light sources 2. A reflective sheet (not shown in the drawings) is provided at a first surface of the tiled large-size LGP, and a plurality of optical sheets (not shown in the drawings) including a diffusion sheet and a prism sheet are provided at a second surface of the tiled large-size LGP opposite to the first surface. The diffusion sheet and the prism sheet are adapted for diffusing and scattering the light provided from the high brightness areas, so as to finally obtain a uniformed brightness displayed on a glass substrate.

Figure 4:
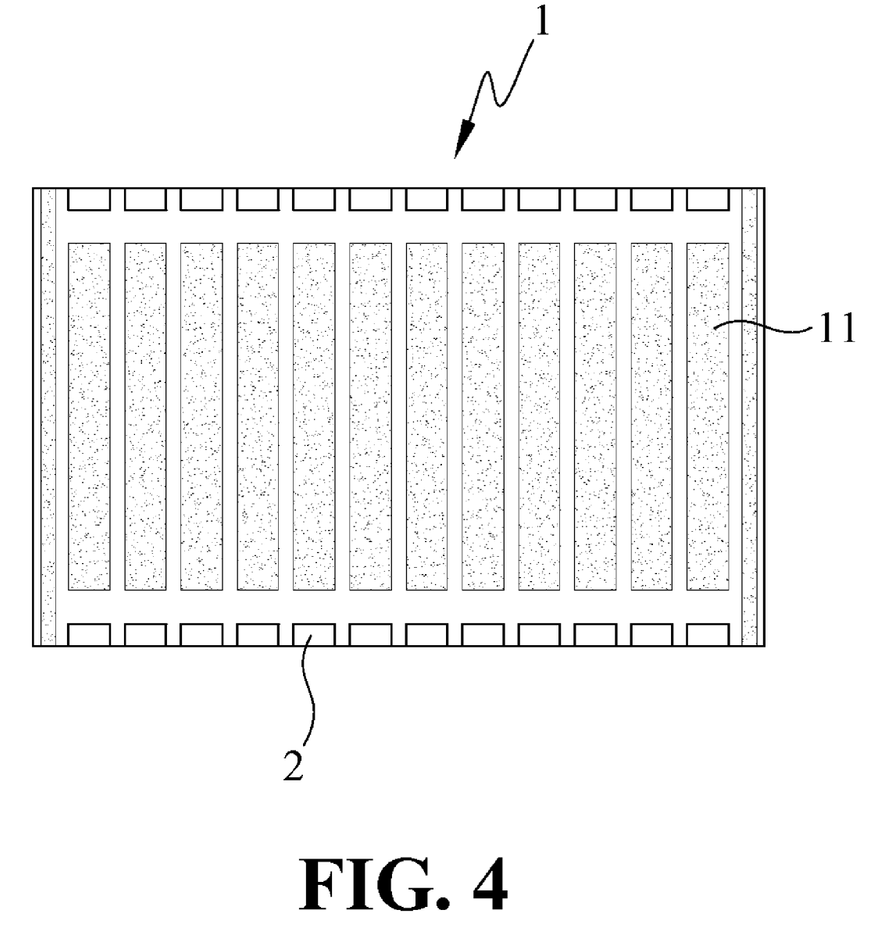
FIG. 4 illustrates that a plurality of LED light sources are symmetrically provided at two opposite sides of the small-size LGP of the first embodiment.

FIG. 4 illustrates that a plurality of LED light sources are symmetrically provided at two opposite sides of the small-size LGP of the first embodiment. Referring to FIG. 4, alternative from FIG. 1, the LED light sources 2 are symmetrically provided at two opposite sides of the small-size LGP 1, and the LED light sources 2 are adapted for simultaneously project light from the two opposite sides to the optical strips 11.

Figure 5:
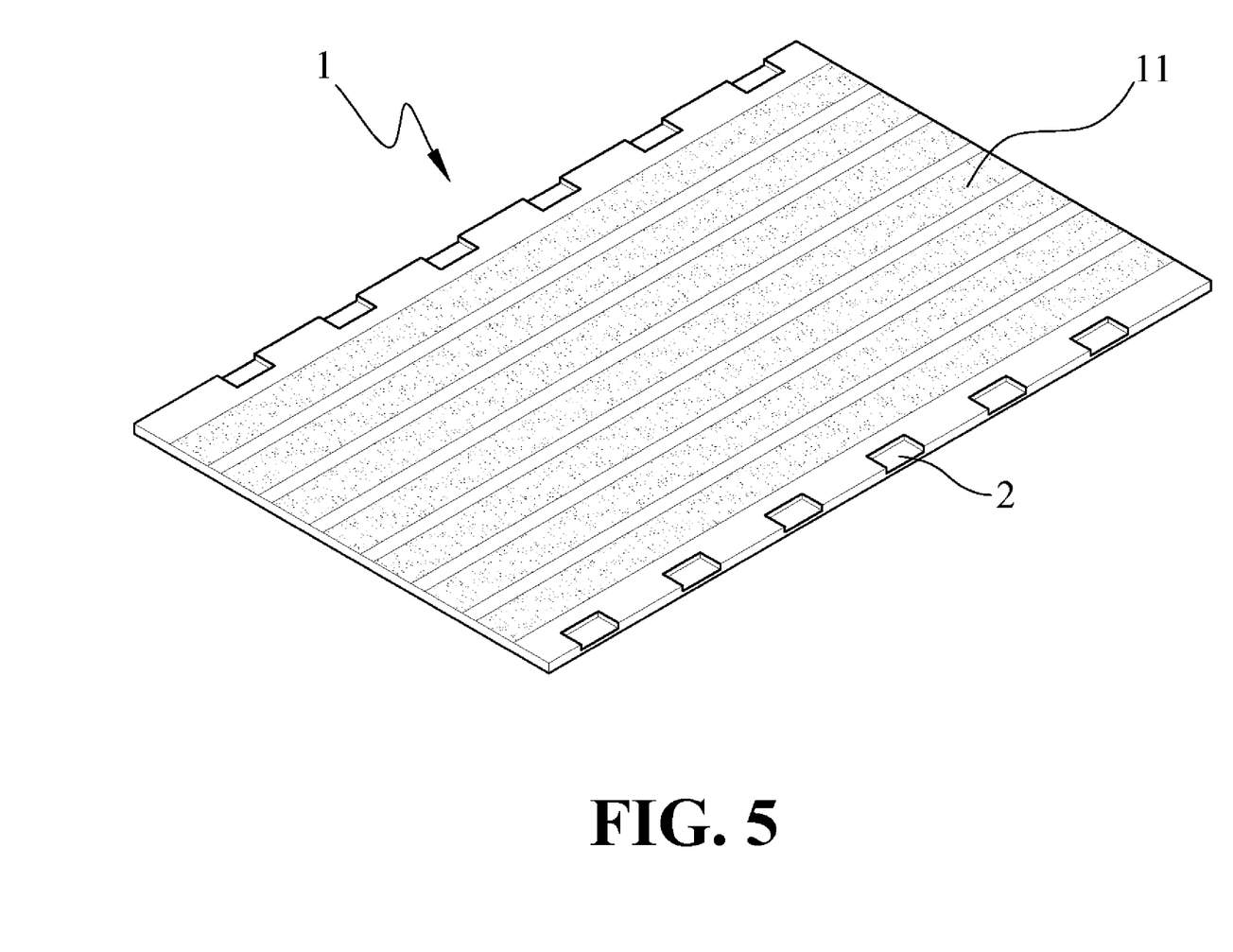
FIG. 5 is a perspective view of a small-size LGP according to a second embodiment of the present invention.

FIG. 5 is a perspective view of a small-size LGP according to a second embodiment of the present invention. Similar to the first embodiment, FIG. 5 illustrates a small-size LGP 1. The small-size LGP 1 includes a plurality of extending optical strips 11 configured thereon. Each optical strip 11 includes a plurality of optical elements. The extending optical strips 11 are equidistantly or non-equidistantly distributed in parallel. The small-size LGP 1 is also provided with a plurality of LED light sources 2. However, differing from the first embodiment, in the second embodiment as shown in FIG. 5, the LED light sources 2 are provided at least one lateral side of the small-size LGP 1, so as to project the light into the small-size LGP 1 along a direction perpendicular to a longitudinal extending direction of the optical strips 11, such that a brightness of strip shaped areas where the extending optical strips 11 are located is apparently higher than the rest areas of the small-size LGP 1. In such a way, the small-size LGP 1 achieves a regular but non-uniform light emitting performance.

The optical strips 11 are structurally as same as discussed in the first embodiment. The fine dots are more sparsely distributed at positions which are more distant away from the LED light sources 2 for reflecting and refracting less of the light, and are more densely distributed at position more adjacent the LED light sources 2 for reflecting and refracting more of the light, so as to achieve an improved uniformed brightness performance over the whole row of optical elements.

Further, alternatively, according to an aspect of the embodiment, the fine dots of each optical strip 11 are designed to achieve a same optical characteristic, so as to achieve a same brightness when the light is projected therein. For example, the fine dots of each optical strip 11 are uniformly distributed with a same density. According to a further aspect of the embodiment, the fine dots of each optical strip 11 are designed to achieve differential optical characteristics, so as to achieve differential brightness when the light is projected therein. For example, the fine dots of each optical strip 11 are non-uniformly distributed with different densities at different positions.

Figure 6:
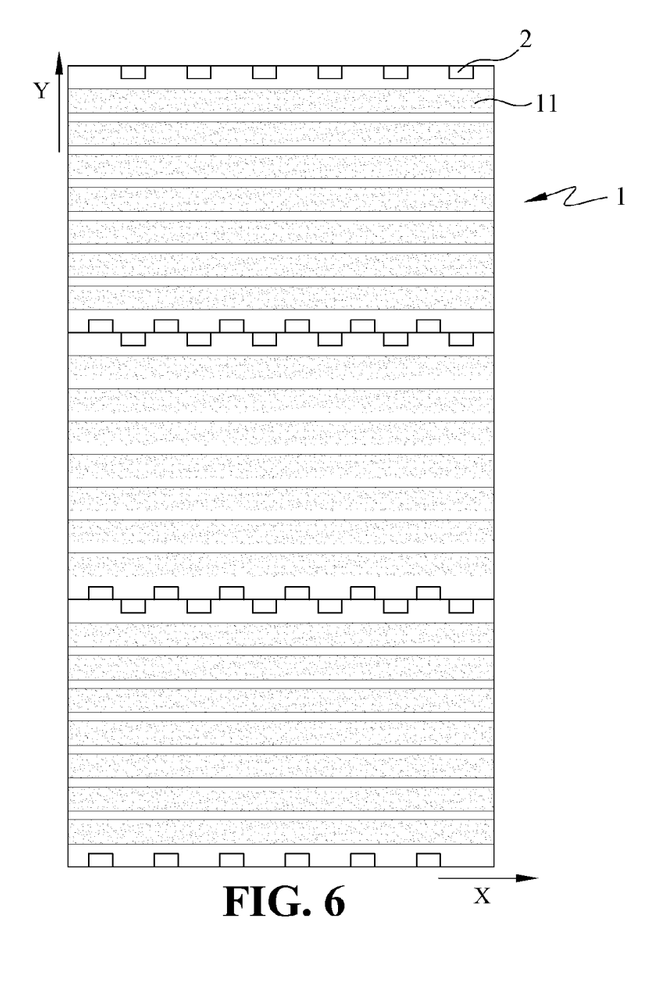
FIG. 6 is a top view of a tiled large-size LGP constituted by side-by-side tiling two small-size LGPs as illustrated in FIG. 5.
Figure 6A:
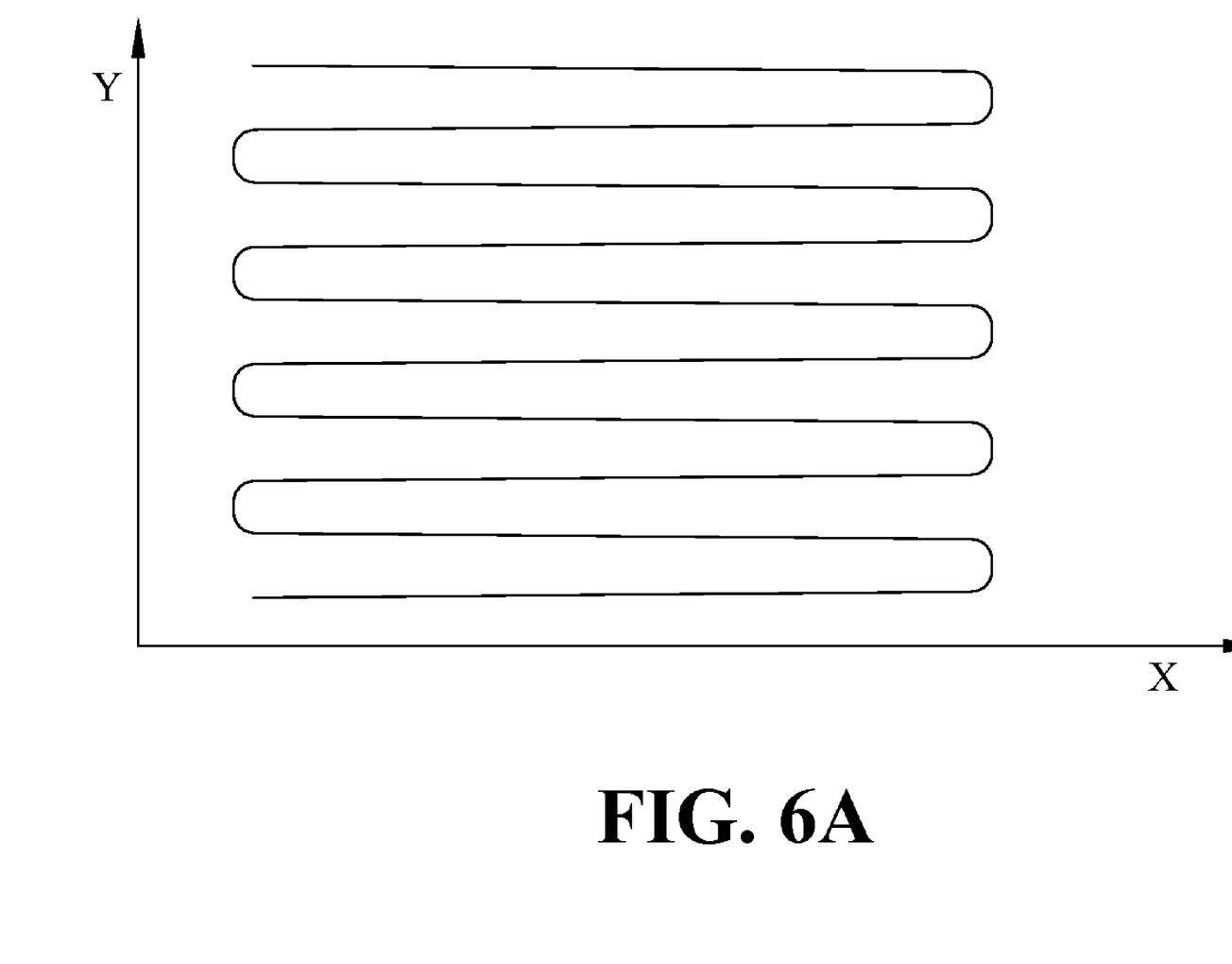
FIG. 6A is a brightness curve depicting the brightness distribution when the tiled large-size LGP as shown in FIG. 6 is projected with a light by light sources.

FIG. 6 is a top view of a tiled large-size LGP constituted by side-by-side tiling two small-size LGPs as illustrated in FIG. 5. As shown in FIG. 6, the large-size LGP is configured by tiling the small-size LGPs 1 side-by-side along Y-direction i.e., along which the extending optical strips 11 longitudinally extend, and the light sources 2 project the light along Y-direction. FIG. 6A is a brightness curve depicting the brightness distribution when the tiled large-size LGP as shown in FIG. 6 is projected with a light by light sources. Referring to FIG. 6A, the areas where the optical strips 11 are located have a higher brightness and are defined as high brightness areas, and the rest areas have a lower brightness or even darkness and are defined as low brightness areas. As such, when the light is projected inside the large-size LGP, the bright lines occurred at joints 12 between the small-size LGPs 1 are enshrouded by the high brightness areas, and become hard to identify or even undistinguishable. That means, the bright lines are "eliminated". Further, the LED light sources 2 can also be provided at both ends of the optical strips 11, so that the light can be projected from opposite sides (not shown in the drawings).

Figure 7:
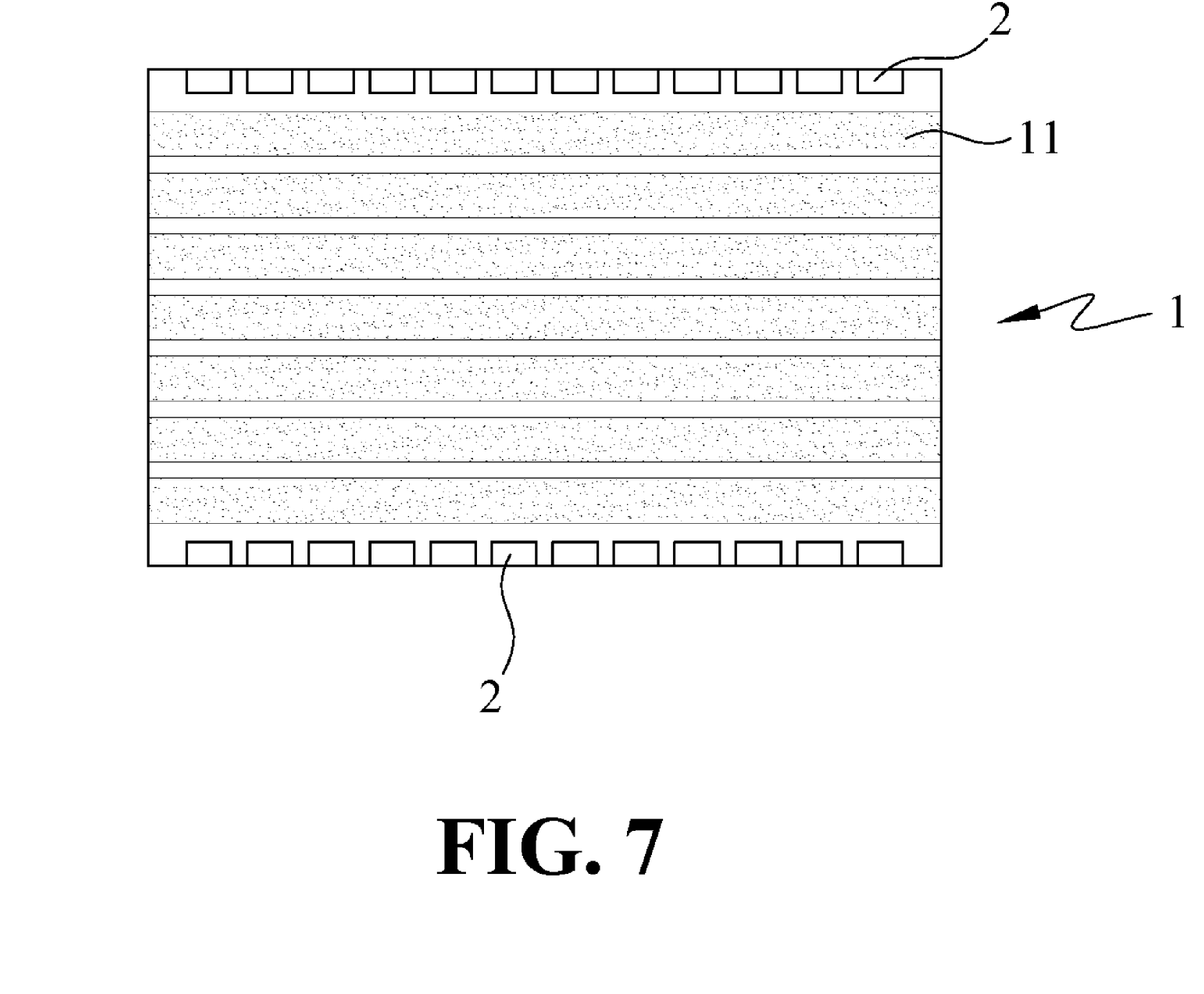
FIG. 7 illustrates that a plurality of LED light sources are symmetrically provided at two opposite sides of the small-size LGP of the second embodiment.

FIG. 7 illustrates that a plurality of LED light sources are symmetrically provided at two opposite sides of the small-size LGP of the second embodiment. Referring to FIG. 7, alternative from FIG. 5, the LED light sources 2 are symmetrically provided at two opposite sides of the small-size LGP 1, and the LED light sources 2 are adapted for simultaneously project light from the two opposite sides to the optical strips 11.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A structure for eliminating bright lines of a tiled backlight module, comprising:
   a light guide plate, having a plurality of rows of optical elements configured on a surface of the light guide plate, wherein the rows of optical elements extend in parallel; and
   a plurality of light sources, provided on at least one side of the light guide plate for projecting a light into the light guide plate and generating a regular but non-uniform light outputting performance of the light guide plate.

2. The structure according to claim 1, wherein the light sources are provided at one end of each row of the optical elements for projecting the light along a direction parallel with a longitudinal extending direction of the optical elements.

3. The structure according to claim 1, wherein the light sources are positioned at a lateral side of the light guide plate for projecting the light along a direction perpendicular to a longitudinal extending direction of the optical elements.

4. The structure according to claim 1, wherein the light sources are provided at two opposite ends of each row of the optical elements for projecting the light along a direction parallel with a longitudinal extending direction of the optical elements.

5. The structure according to claim 2, wherein the light sources provided at the ends of each two neighboring rows of optical elements are positioned at opposite sides of the light guide plate.

6. The structure according to claim 1, wherein the optical elements are a plurality of fine dots protruded out from the surface of the light guide plate.

7. The structure according to claim 1, wherein the optical elements are a plurality of fine dots recessive from the surface of the light guide plate.

8. The structure according to claim 6, wherein the fine dots are more sparsely distributed at positions which are more distant away from the light sources, and are more densely distributed at positions more adjacent the light sources.

9. The structure according to claim 7, wherein the fine dots are more sparsely distributed at positions which are more distant away from the light sources, and are more densely distributed at positions more adjacent the light sources.

10. The structure according to claim 1, wherein each of the rows of optical elements is featured with a same optical performance, and when the light sources project the light thereto, the rows of optical elements present a same brightness.

11. The structure according to claim 1, wherein each of the rows of optical elements is featured with a differential optical performance, and when the light sources project the light thereto, the rows of optical elements present a differential brightness.

12. The structure according to claim 1, wherein the rows of optical elements are equidistantly and parallel arranged.

13. The structure according to claim 1, wherein the rows of optical elements are non-equidistantly but parallel arranged.

* * * * *